United States Patent [19]

Sakai et al.

[11] Patent Number: 4,673,447

[45] Date of Patent: Jun. 16, 1987

[54] METHOD FOR SUPPORTING A METAL STRIP UNDER STATIC GAS PRESSURE

[75] Inventors: Kango Sakai, Kitakyushu; Yasuo Shimokawa, Fukuoka, both of Japan

[73] Assignee: Nippon Steel Corporation, Tokyo, Japan

[21] Appl. No.: 775,695

[22] Filed: Sep. 13, 1985

Related U.S. Application Data

[60] Division of Ser. No. 667,386, Nov. 2, 1984, abandoned, which is a continuation of Ser. No. 442,134, Nov. 16, 1982, abandoned, which is a continuation-in-part of Ser. No. 258,473, Apr. 28, 1981, abandoned.

[30] Foreign Application Priority Data

Apr. 30, 1980 [JP] Japan ................................ 55-56129
Oct. 6, 1980 [JP] Japan ................................ 55-138671

[51] Int. Cl.[4] .............................................. C21D 1/00
[52] U.S. Cl. .................................... 148/156; 134/156; 226/7
[58] Field of Search .................... 118/65, 67, 68; 134/156; 226/97, 196.7; 266/111–113, 102, 103; 148/156

[56] References Cited

U.S. PATENT DOCUMENTS 3,097,971 7/1963 Carlisle et al. ........................ 34/156

FOREIGN PATENT DOCUMENTS 65201 8/1971 Australia .
22607 2/1976 Japan .................................. 266/111
970871 4/1964 United Kingdom .

Primary Examiner—Christopher W. Brody
Attorney, Agent, or Firm—Kenyon & Kenyon

[57] ABSTRACT

A metal strip is supported under static gas pressure by using an apparatus which comprises a pair of gas pressure pads facing each other and located symmetrically about a predetermined moving path of the metal strip, each gas pressure pad having an opening through which a gas is ejected toward the moving path of the metal strip, and means for supplying a gas under pressure to each of the gas pressure pads, each opening being in the form of a closed channel which is composed of a pair of lateral slits, each lateral slit extending in the lateral direction of the moving path of the metal strip, and two or more pairs of longitudinal slits, each longitudinal slit extending in an inclined direction to the longitudinal direction of the moving path, and connecting therethrough to each of the lateral slits, the opening being formed symmetrically about a longitudinal center line of the front surface of the gas pressure pad, drawn parallel to the longitudinal axis of the moving path.

9 Claims, 33 Drawing Figures

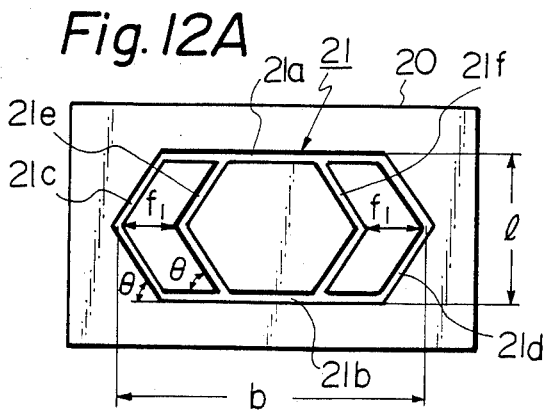
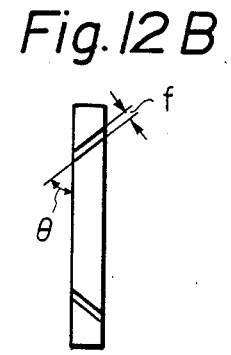
Fig. 12A  Fig. 12B
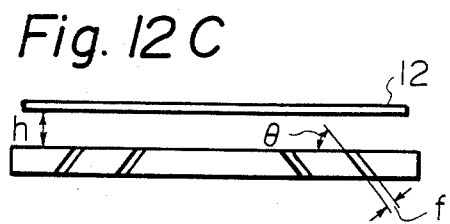
Fig. 12C
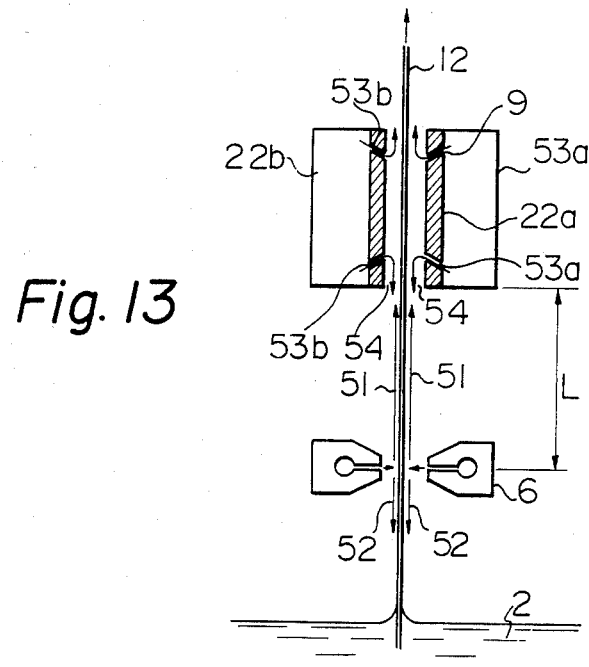
Fig. 13

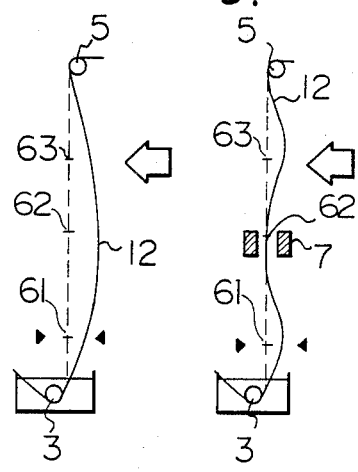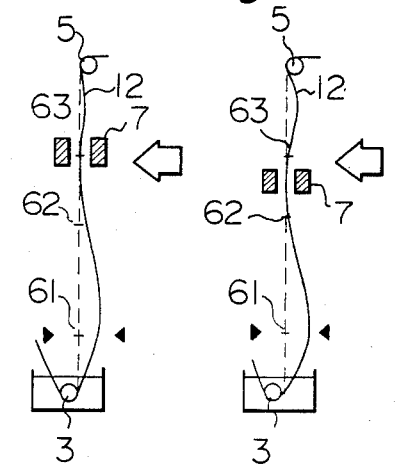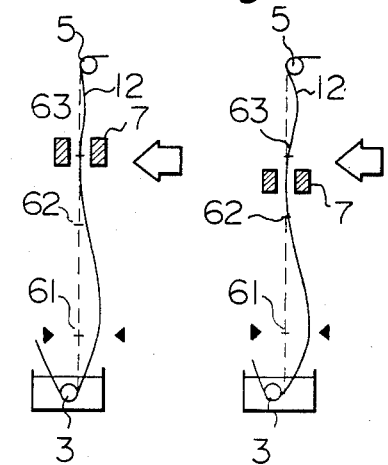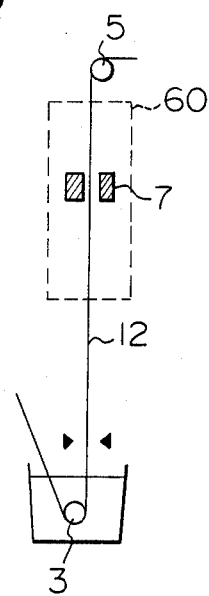

METHOD FOR SUPPORTING A METAL STRIP UNDER STATIC GAS PRESSURE

This application is a divisional of application Ser. No. 667,386 filed Nov. 2, 1984 now abandoned which is a continuation of Ser. No. 442,134 filed Nov. 16, 1982 (now abandoned) which is a continuation-in-part of Ser. No. 258,473 filed Apr. 28, 1981 (now abandoned).

FIELD OF THE INVENTION

The present invention relates to an apparatus and method for supporting a metal strip under static gas pressure. More particulary, the present invention relates to an apparatus and method for supporting, under static gas pressure, a metal strip moving along a predetermined moving path thereof without causing the metal strip to vibrate or be deformed.

BACKGROUND OF THE INVENTION

In various processes in which a metal strip is moved along a predetermined moving path thereof it is extremely necessary to prevent deformation of and vibration of the moving metal strip. In addition, if the metal strip is deformed, it is very necessary to reform the deformed moving metal strip while the metal strip moves along its moving path.

For example, in a continuous hot galvanizing process for a steel strip, after the hot dip galvanized steel strip is subjected to a gas-wiping procedure for controlling the weight of the resultant coating, the wiped steel strip must move over a long distance between a pair of guide rolls without touching any other solid supports. Also, in a paint-coating process or in a heat-treating furnace for a steel strip, the steel strip must be supported, while moving over a long distance, between a pair of fixed guide rolls without contacting any other solid supports.

In the above-mentioned cases, the metal strip is sometimes vibrated and/or laterally warped so that it exhibits a C-shaped cross-sectional profile. This type of deformation of the metal strip is hereinafter referred to as "C-warping".

In order to support the metal strip moving along its moving path without using any solid supporting means, and at the same time prevent undesirable vibration and/or deformation of the metal strip, it has been attempted to utilize a fluid-cushioning effect derived from the application of a dynamic gas pressure or a static gas pressure onto both surfaces of the metal strip. In this type of supporting apparatus, it is important that the supporting apparatus stably support the metal strip and that the fluid used for supporting the metal strip not deteriorate the quality of the metal strip. For example, in a continuous hot galvanizing apparatus in which a gas-wiping procedure is applied to a galvanized metal strip, the metal strip is vertically removed from a galvainzing bath and is supported by a fluid stream ejected through a nozzle, formed parallel to the path along which the metal strip moves, without touching the fixed solid supporting means. In this case, the metal strip is locally cooled when the ejected fluid is cool or unevenly overheated when the ejected fluid is hot. This local cooling or heating causes the distribution of temperature on the metal strip to be uneven in the lateral direction of the metal strip. This phenomenon results in an unevenness in the galvanization of the metal strip, rendering the resultant product useless.

In another example, when a coated steel strip is dried while being supported by supporting fluid streams without touching the solid supporting means, the temperature distribution of the dried steel strip becomes uneven. This phenomenon causes the appearance of the resultant product to be deteriorated.

In still another example, when a metal strip is supported in a heat-treating furnace without touching the solid supporting means, the supporting fluid streams cause the temperature distribution on the metal strip to be uneven in the lateral direction of the metal strip. This uneven temperature distribution causes the quality of the resultant product to be uneven.

In a conventional supporting apparatus, it is considered important only to stably support the metal strip. That is, it is not considered how the supporting procedure affects the appearance and properties of the resultant product.

SUMMARY OF THE INVENTION

An object of the present invention is to provide an apparatus and method for supporting a metal strip without touching the metal strip, while at the same time preventing local cooling or heating of the metal strip, which apparatus and method are free from the above-mentioned disadvantages of the conventional supporting apparatuses and methods.

Another object of the present invention is to provide an apparatus and method for supporting a metal strip without touching the metal strip, while allowing the metal strip to move at a high speed.

Still another object of the present invention is to provide an apparatus and method for supporting a metal strip in which the working width of the apparatus can be rapidly changed in accordance with a change in the width of the metal strip.

A further object of the present invention is to provide an apparatus and method for supporting a metal strip in which the metal strip can be brought back into its predetermined moving path if it moves outside still the predetermined moving path due to vibration.

A still further object of the present invention is to provide an apparatus and method for supporting a metal strip in which the metal strip can be restored to its original position if it is twisted about the longitudinal axis thereof due to vibration.

Yet a further object of the present invention is to provide an apparatus and method for supporting a metal strip in which the metal strip can be reformed to its original shape if it is C-warped.

Yet another object of the present invention is to provide an apparatus and method for supporting a metal strip by using a gas in an amount as small as possible and under a static gas pressure as low as possible.

The above-mentioned objects can be attained by the present invention.

The apparatus of the present invention for supporting a metal strip under static gas pressure comprises a pair of gas pressure pads facing each other and located symmetrically about a predetermined moving path of a metal strip, each gas pressure pad having an opening through which a gas is ejected toward the moving path of the metal strip and means for supplying a gas under pressure to each of the gas pressure pads, each opening being in the form of a closed channel which is composed of a pair of lateral slits, each lateral slit extending in the lateral direction of the moving path of the metal strip, and at least two pairs of longitudinal slits, each longitudinal slit extending in the longitudinal direction of the moving path of the metal strip, and each longitudinal slit connecting therethrough the lateral slits to each other, and each opening being symmetrical about a longitudinal center line of the front surface of the gas pressure pad, drawn parallel to the longitudinal axis of the moving path of the metal strip, which apparatus is characterized in that each of the longitudinal slits extends in a direction inclined from the longitudinal direction of the moving path of the metal strip.

Also, the method of the present invention for supporting a metal strip under a static gas pressure comprises ejecting a gas from a pair of gas pressure pads, which face each other and are located symmetrically about a predetermined moving path of a metal strip, onto both surfaces of the metal strip which is moving along the moving path thereof through a pair of gas-ejecting openings, each opening being formed in the front surface of each gas pressure pad, the gas-ejecting procedure being carried out through a closed channel-shaped opening which is composed of a pair of lateral slits, each lateral slit extending in the lateral direction of the moving path of the metal strip, and at least two pairs of longitudinal slits, each longitudinal slit extending in the longitudinal direction of the moving path of the metal strip and each longitudinal slit connecting therethrough the lateral slits to each other, and which opening is symmetrical about the longitudinal center line of the front surface of the gas pressure pad, drawn parallel to the longitudinal direction of the moving path of the metal strip, whereby at least three static gas pressure regions, each region being surrounded by a closed curtain-shaped gas stream, are created in each of the gaps between the surfaces of the metal strip and the gas pressure pads, the static gas pressure distribution of the static gas pressure regions being symmetrical about the longitudinal axis of the moving path of the metal strip, which method is characterized in that each longitudnal slit extends in a direction inclined to the longitudinal direction of the moving path of the metal strip.

BRIEF DESCRIPTION OF THE INVENTION

FIG. 12A shows a front view of an embodiment of a front surface plate of a gas pressure pad usable for the present invention;

FIG. 12B shows a longitudinal cross-sectional view of the front surface plate indicated in FIG. 12A;

FIG. 12C shows a lateral cross-sectional view of the front surface plate indicated in FIG. 12A;

FIG. 13 shows a longitudinal cross-sectional view of a hot galvanizing apparatus having a pair of wiping-gas nozzles and a pair of gas pressure pads usable for the present invention;

Figure 19A:
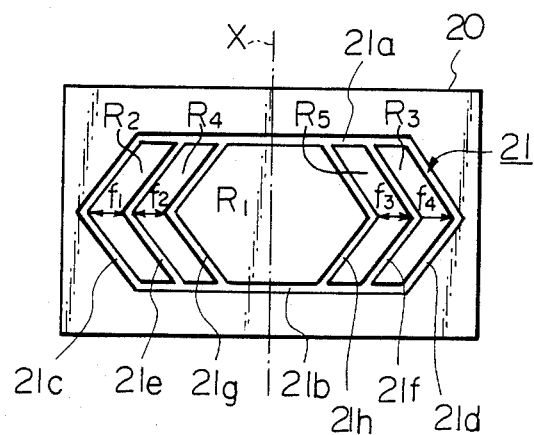
Figure 19B:
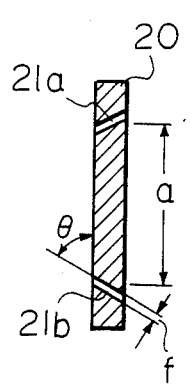
Figure 19C:
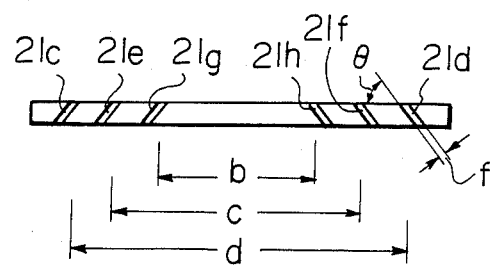

FIGS. 17A through 17D, respectively, show the relationship between the vibration of a metal strip and the location of a pair of gas pressure pads;

FIG. 18 explanatorily shows a hot galvanizing apparatus having a furnace and a pair of gas pressure pads;

FIG. 19A is a front view of a front plate of a gas pressure pad usable for the present invention;

FIG. 19B is a longitudinal cross-sectional view of the front surface plate indicated in FIG. 19A; and FIG. 19C is a lateral cross-sectional view of the front surface plate indicated in FIG. 19A.

DETAILED DESCRIPTION OF THE INVENTION

The apparatus of the present invention is characterized in that the gas-ejecting opening formed in the front surface of the gas pressure pad exhibits a specific shape. That is, the gas-ejecting opening is characterized by at least two pairs of longitudinal slits, each slit extending in a direction inclined to the longitudinal direction of the moving path of the metal strip so as to connect therethrough to each of a pair of lateral slits.

The two or more pairs of inclined longitudinal slits are effective not only for creating three or more static gas pressure regions which are independent from each other and are arranged along a line lateral to the moving path of the metal strip, in the gaps between the gas pressure pad surface and the metal strip surfaces, but also for preventing local heating or cooling of the metal strip. The static gas pressure regions are highly effective for eliminating the disadvantages of the conventional supporting apparatuses and methods; especially, for reforming a C-warped metal strip and for returning the twisted metal strip to its original position.

As stated hereinbefore, the apparatus and method of the present invention can be applied to a continuous hot galvanizing process for the metal strip.

Figure 1:
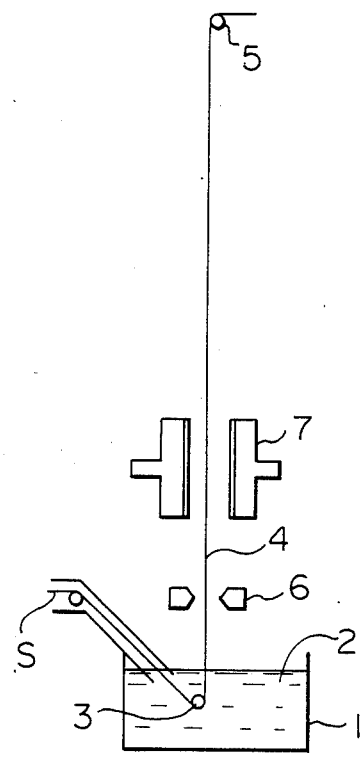
FIG. 1 shows an explanatory view of a continuous hot dip galvanizing apparatus for a metal strip containing a pair of gas pressure pads and a pair of wiping-gas nozzles.

Referring to FIG. 1, a metal strip S is introduced downwardly into a hot galvanizing bath 1 containing therein a molten metal 2 and is then withdrawn upwardly by being passed around a bottom roll 3 which is submerged below the surface of the molten metal. The galvanized metal strip 4 passes from the surface of the molten metal 2 to a top roll 5. A pair of wiping-gas nozzles 6 is located above the surface of the molten metal 2. In order to adjust the amount (weight) of the molten metal coating galvanized on the surfaces of the metal strip to a desired amount, gas streams, for example, nitrogen gas streams, are ejected under a high pressure onto the surfaces of the galvanized metal strip through the wiping-gas nozzles 6. During this procedure, the metal strip 4 moves at a high speed. Therefore, the high-pressure ejection of the wiping gas causes the metal strip moving between the bottom roll 3 and the top roll 5 to vibrate. This vibration creates tension in the metal strip, which tension causes the metal strip to be C-warped. Also, the vibration causes the metal strip to run outside the moving path thereof or to twist about the longitudinal axis thereof. Vibration, C-warping, and twisting of the metal strip sometimes cause the metal strip surfaces to come into contact with the wiping gas nozzles 6. This contact with the wiping gas nozzles damages the galvanized surface of the metal strip. In addition, vibration, C-warping and twisting of the metal strip cause the galvanized metal layer formed on the metal strip surfaces to be uneven. Therefore, it is necessary to prevent vibration, C-warping, and twisting of the metal strip. For this purpose, a pair of gas pressure pads 7 are arranged facing each other across the moving path of the metal strip 4. Generally, the amount (weight) of the metal coating is variable depending on the wiping-gas pressure and the distance between the wiping gas nozzles and the metal strip. Also, a change in the distance between the wiping gas nozzles and the metal strip results in vibration, C-warping, and/or twisting of the metal strip. Therefore, in order to obtain a uniform metal coating, it is important to maintain the distance between the wiping-gas nozzles and the metal strip constant.

A prior art of the apparatus for supporting a metal strip under static gas pressure is disclosed in, for example, Japanese Examined Patent Publication (Kokoku) No. 43-28961 (U.S. Pat. No. 3,097,971) and No. 46-39566. In the prior art apparatus, the gas-ejecting opening is composed of a pair of lateral straight slits each extending in the lateral direction of the moving path of the metal strip and at least one pair of longitudinal straight slits each extending parallel to the longitudinal direction of the moving path of the metal strip and each connecting therethrough the lateral slits to each other so as to provide a closed channel-form opening. In this type of gas-ejecting opening, the gas-ejecting procedure results in uneven cooling or heating of the metal strip.

This phenomenon is explained below with reference to FIGS. 2A, 2B, and 2C, which show a static gas pressure pad disclosed in Japanese Examined Patent Publication (Kokoku) No. 46-39566.

Figure 2A:
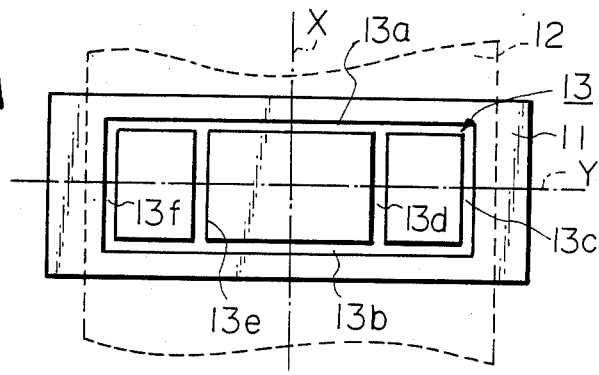
FIG. 2A is a front view of a gas pressure pad of a prior art having a gas-ejecting opening.

Referring to FIG. 2A, a static gas pressure pad 11 is located so that a front surface thereof faces a surface of a metal strip 12. The front surface of the pad 11 has a closed gas-ejecting opening 13 which is composed of a pair of lateral slits 13a and 13b and two pairs of longitudinal slits 13c and 13f and 13d and 13e. Each of the lateral slits 13a and 13b extends parallel to the lateral center line Y, which is drawn at right angles to the longitudinal center line X of the moving path of the metal strip. Each of the longitudinal slits 13c, 13f, 13d, and 13e extends parallel to the longitudinal center line X and connects therethrough the lateral slit 13a to the lateral slit 13b so as to form a closed channel-shaped, gas-ejecting opening 13 as a whole.

Figure 2B:
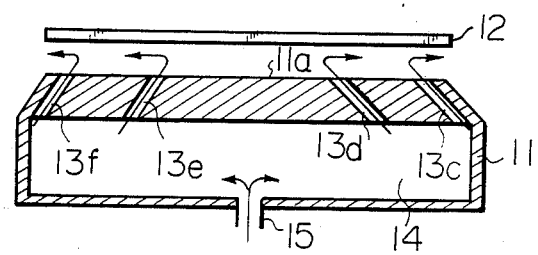
FIG. 2B is a cross-sectional view of an embodiment of a gas pressure pad having the gas-ejecting opening indicated in FIG. 2A.
Figure 2C:
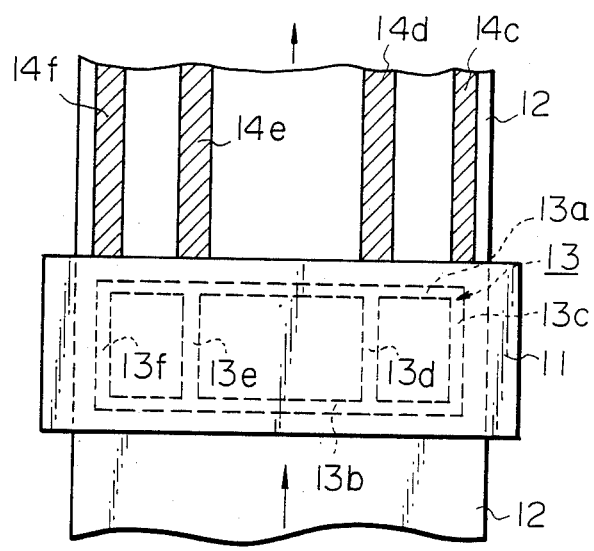
FIG. 2C shows an uneven temperature distribution on a metal strip supported by a gas pressure pad having the gas-ejecting opening indicated in FIG. 2A.

Referring to FIG. 2B, the static gas pressure pad 11 is located next to the metal strip 12, which moves vertically so that the front surface 11a of the static gas pressure pad 11 faces a surface of the metal strip 12. The pad 11 has a gas pressure chamber 14 which is connected to the source of a pressurized gas (not shown in the drawing) through a conduit 15 and to the gas-ejecting opening containing the slits 13c, 13f, 13d, and 13e.

Figure 3A:
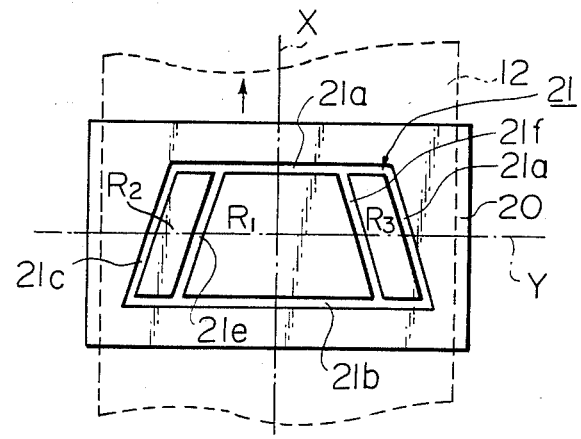
FIG. 3A is a front view of a front surface plate of a gas pressure pad usable for the present invention.
Figure 3B:
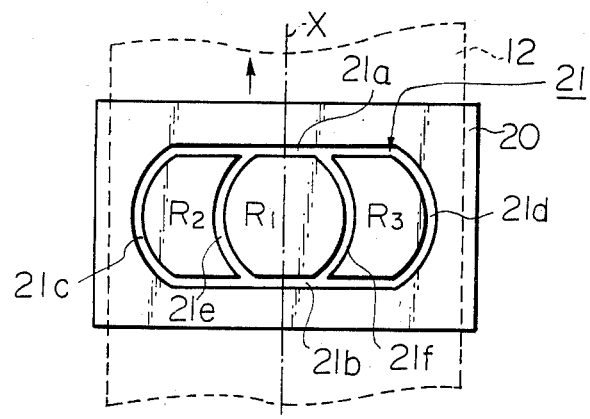
FIG. 3B is a front view of another front surface plate of a gas pressure pad usable for the present invention.

Referring to FIG. 3B, when the static gas pressure pad 11 having a closed channel-shaped gas-ejecting opening 13 is used for supporting a continuously hot galvanized metal strip 12 in the apparatus indicated in FIG. 1, a gas is ejected through the gas-ejecting opening 13 toward a surface of the metal strip 12. In this case, portions of the surface of the metal strip 12 which directly face the longitudinal slits 13c, 13f, 13d, and 13e are blown by portions of the ejected gas which are ejected through the longitudinal slits 13c, 13f, 13d, and 13e for a longer time than other portions of the surface of the metal strip 12. Usually, the time period during which the portions of the surface of the metal strip directly facing the longitudinal slits contact the portions of the ejected gas which are ejected through the longitudinal slits is 25 times to 100 times that of the other portions of the surface of the metal strip. When the ejected gas is cold, the portions of the metal strip blown by the ejected gas for a long time are cooled to a larger extent than other portions of the metal strip which are exposed to the ejected gas for a short time. That is, the above-mentioned phenomenon results in the formation of overcooled portions 14c, 14f, 14d, and 14e in the form of stripes on the metal strip 12, as indicated in FIG. 2C. The formation of overcooled portions results in the formation of unevenly hot galvanized portions on the metal strip. The resultant galvanized metal strip exhibits an uneven appearance and, therefore, is commercially useless.

The apparatus and method of the present invention can eliminate the above-mentioned disadvantages of the prior arts by inclining the longitudinal slits in the gas-ejecting opening to the longitudinal direction of the moving path of the metal strip.

Referring to FIG. 3A, a front surface of a static gas pressure pad 20 has a closed channel-shaped gas-ejecting opening 21 facing a surface of a metal strip 12. The opening 21 is composed of a pair of lateral slits 21a and 21b and two pairs of longitudinal slits 21c and 21d and 21e and 21f. The longitudinal slits are in the form of straight lines and incline toward the longitudinal center line X of the moving path of the metal strip. This type of gas-ejecting opening 21 is effective for preventing local overcooling of the metal strip and for producing a uniformly galvanized product.

In FIG. 3A, the longitudinal slits upwardly approach the longitudinal center line X of the moving path of the metal strip. However, the longitudinal slits may downwardly approach the longitudinal center line X. In FIG. 3B, the two pairs of longitudinal slits 21c and 21d and 21e and 21f are in the form of curves expanding outwardly from the longitudinal center line X of the moving path of the metal strip.

The curved longitudinal slits may expand inwardly toward the longitudinal center line X.

Figure 3C:
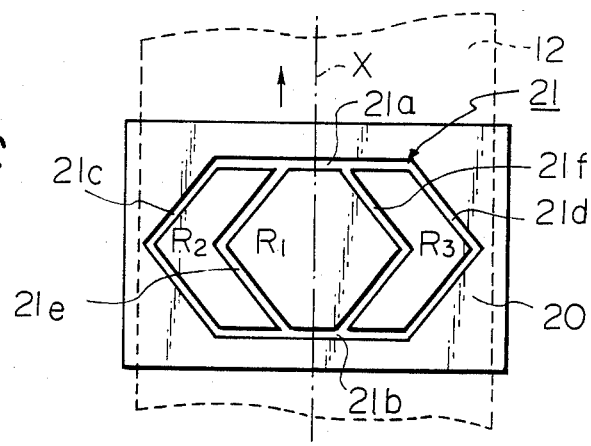
FIG. 3C is a front view of still another front surface plate of a gas pressure pad usable for the present invention.

In FIG. 3C, the two pairs of longitudinal slits 21c and 21d and 21e and 21f are in the form of hooked lines expanding outwardly from the longitudinal center line X of the moving path of the metal strip. The hooked line-shaped slits may expand inwardly toward the longitudinal center line X.

In the static pressure pads indicated in FIGS. 3A, 3B, and 3C, each gas-ejecting opening has two pairs of longitudinal slits. However, each opening may contain three or more pairs of longitudinal slits which are not parallel to the longitudinal center line of the moving path of the metal strip. The inclined longitudinal slits are effective not only for supporting the metal strip by static gas pressure created thereon but also for preventing uneven cooling or heating of the metal strip.

The structure of the static gas pressure pad of the present invention and the generation of at least three static gas pressure regions, which are independent from each other, on the surface of the metal strip will be described in detail below.

Figure 4A:
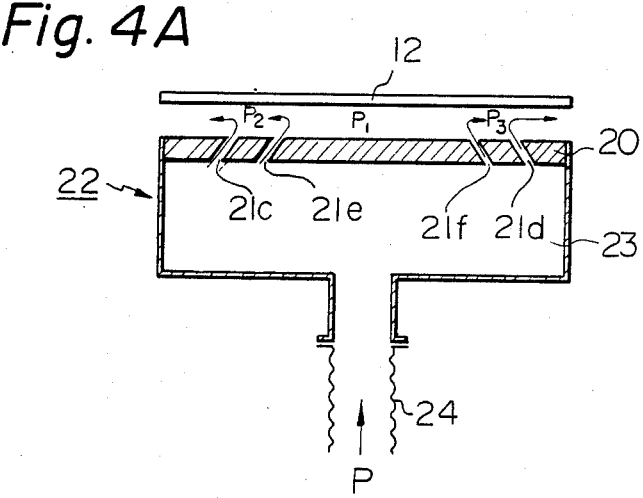
FIG. 4A is a horizontal cross-sectional view of an embodiment of a gas pressure pad usable for the present invention.

FIG. 4A shows a horizontal cross-sectional profile of a metal strip 12 moving vertically and a gas pressure pad 22 having a front surface plate 20 as indicated in FIG. 3A, 3B, or 3C. The gas pressure pad 22 has a gas pressure chamber 23 connected to a source of a pressurized gas (not shown in the drawing) through a flexible conduit 24. This cross-sectional profile is parallel to the lateral slits of the gas-ejecting opening and across the longitudinal slits 21c through 21e.

Figure 4B:
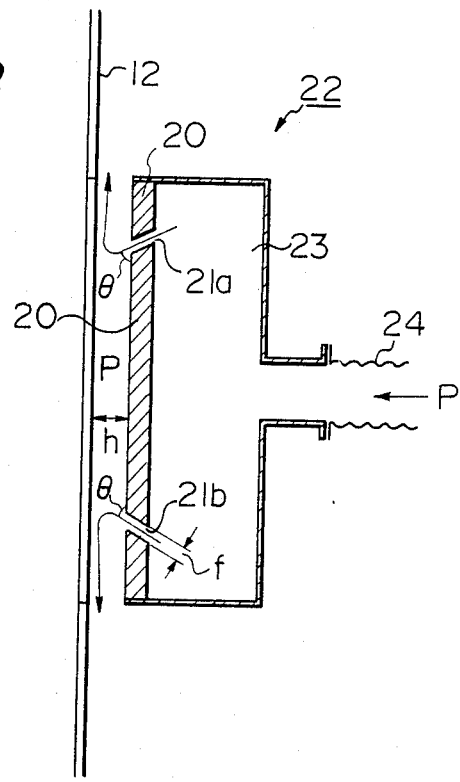
FIG. 4B is a vertical cross-sectional view of the gas pressure pad indicated in FIG. 4A.

FIG. 4B shows a vertical cross-sectional profile of the metal strip 12 and the gas pressure pad 22 indicated in FIG. 4A. This cross-sectional profile is across only the lateral slits 21a and 21b. It is preferable that the front surface plate 20 be removable from the gas pressure chamber 23.

When a gas is ejected under pressure through the opening indicated in FIGS. 4A and 4B, three static gas pressure regions, each region being surrounded by a curtain-shaped gas stream, are created in the gap between the metal strip 12 and the gas pressure pad 20.

The static gas pressure regions correspond to the rectangular regions $R_1$, $R_2$, and $R_3$ indicated in FIGS. 3A, 3B, and 3C and have the static gas pressures $P_1$, $P_2$, and $P_3$ indicated in FIG. 4A.

Generally, the static gas pressure P created in a static gas pressure region is calculated in accordance with the equation:

$$P = \rho u^2 t / h \, (1 + \cos \theta)$$

wherein h represents the distance between the front surface of the pad 22 and the surface of the metal strip 12, $\rho$ represents the density of the gas, u represents the flow velocity of the gas in the opening, t represents the thickness of the slit, and $\theta$ represents the angle between the front surface of the pad and the gas-ejecting direction of the slit. Usually, t = 10 mm or less, preferably 2 to 5 mm, and $\theta = 30 \sim 90$ degrees. The t and $\theta$ of the slits may be identical to each other or may be different from each other. If they are different, it is necessary that the $\theta$ and t, respectively, be symmetrical about the longitudinal center line of the front surface of the pad.

The front surface plate 20 having a gas-ejecting slit may be removable from the gas pressure pad.

Referring to FIGS. 4A and 4B, the gas flowing through the longitudinal and lateral slits has the same pressure in all the slits. In this case, the static pressures $P_1$ through P are all the same.

Figure 5:
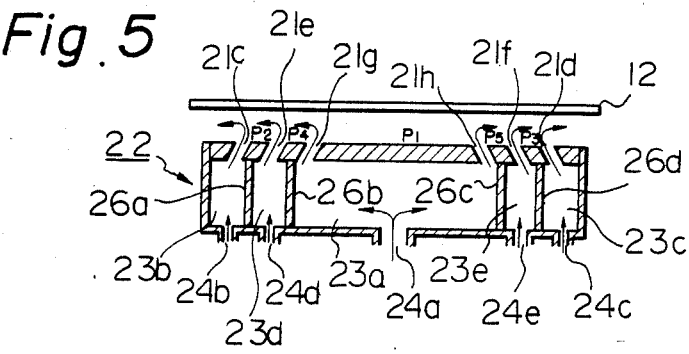
FIG. 5 is a lateral cross-sectional view of another embodiment of a gas pressure pad usable for the present invention.

Referring to FIG. 5, the gas pressure pad 22 has a gas-ejecting opening connected to five gas pressure chambers 23a, 23b, 23c, 23d, and 23e separated from each other by partitions 26a, 26b, 26c, and 26d. The chambers 23a, 23b, 23c, 23d, and 23e are, respectively, connected to sources of pressurized gas (not shown in the drawing) through conduits 24a, 24b, 24c, 24d, and 24e. In this case, when the pressures of the gas supplied to the chambers 23a through 23e are different from each other, the resultant static gas pressure regions, respectively, exhibit static pressures $P_1$, $P_2$, $P_3$, $P_4$, and $P_5$ which are different from each other. That is, each of the pressures $P_1$ through $P_5$ can be adjusted, independently from the others, to a desired value by controlling the pressure of the gas supplied to each gas pressure chamber.

Figure 6:
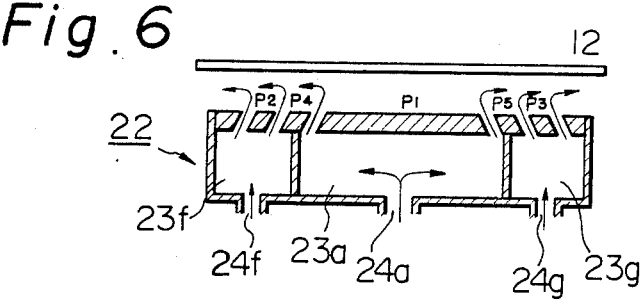
FIG. 6 is a lateral cross-sectional view of still another embodiment of a gas pressure pad usable for the present invention.

The gas pressure pad may have three gas pressure chambers partitioned in the manner indicated in FIG. 6. In this case, when the pressure of the gas fed into the chamber 23a through the conduit 24a is lower than that fed into the chamber 23f through the conduit 24f and into the chamber 23g through the conduit 24g and when the pressure of the gas in the chamber 23f is equal to that in the chamber 23g, the resultant static pressures $P_1$ through $P_5$ exhibit the following relationship:

$P_1 < P_4 < P_2$ $P_1 < P_5 < P_3$ $P_2 = P_3$ and $P_4 = P_5$.

That is, the distribution of pressure in the gap between the metal strip 12 and the gas pressure pad 22 is symmetrical about the longitudinal center line X (not shown in the drawing) of the moving path of the metal strip, indicated, for example, in FIG. 19A.

Figure 7:
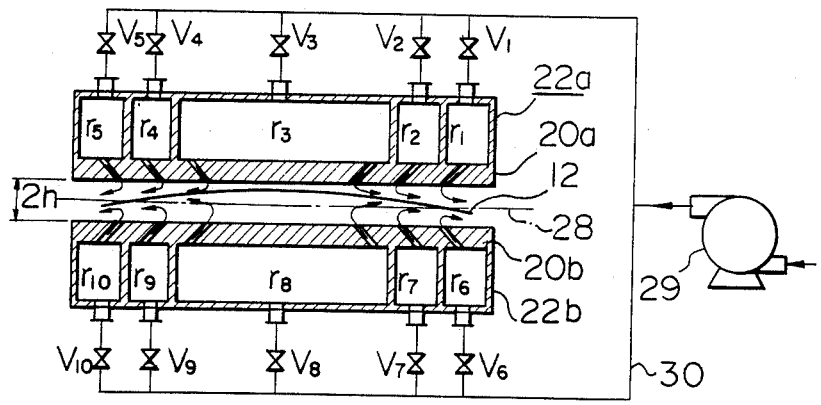
FIG. 7 is an explanatory lateral cross-sectional view of an embodiment of a metal strip-supporting apparatus of the present invention.

Referring to FIG. 7, a pair of gas pressure pads 22a and 22b facing each other across a moving path 28 of a metal strip contain gas pressure chambers $r_1$ through $r_{10}$, which chambers are all connected to a supply source 29 of a pressurized gas, for example, a blower 29, through a conduit 30. The pressure in the chambers $r_1$ through $r_{10}$, respectively, can be controlled by using valves $V_1$ through $V_{10}$ independently from each other.

Figure 8:
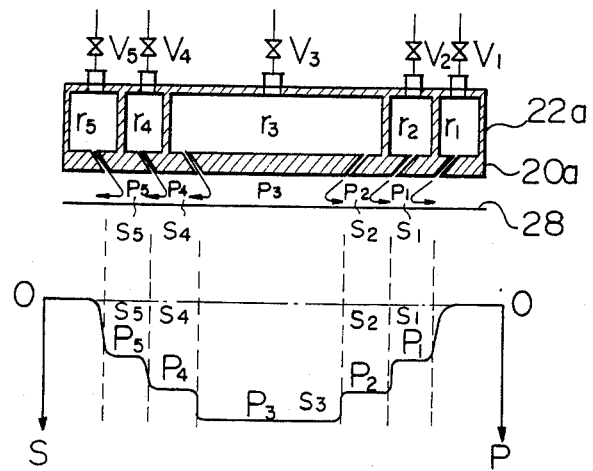
FIG. 8 is an explanatory lateral cross-sectional view of an upper gas pressure pad in the apparatus indicated in FIG. 7 and shows the intensity of the resultant static pressures.

Referring to FIG. 8, when the pressure in each of the chambers $r_1$ through $r_5$ is the same, the resultant static pressures $P_1$ through $P_5$ have the following relationship:
$$P_3 > P_2 = P_4 > P_1 = P_5$$

Also, the stabilities $S_1$ through $S_5$ of the static gas pressure regions, respectively, corresponding to the pressures $P_1$ through $P_5$ have the following relationship:

$$S_3 > S_2 = S_4 > S_1 = S_5$$

These phenomena are due to the confining effect of the gas streams surrounding each static gas pressure region. The pressures $P_1$ through $P_5$ can be adjusted, independently from each other, to the desired values by controlling the valves $V_1$ through $V_5$, respectively.

The above-mentioned relationships can be obtained by connecting all the slit segments to one single gas pressure chamber.

Figure 9:
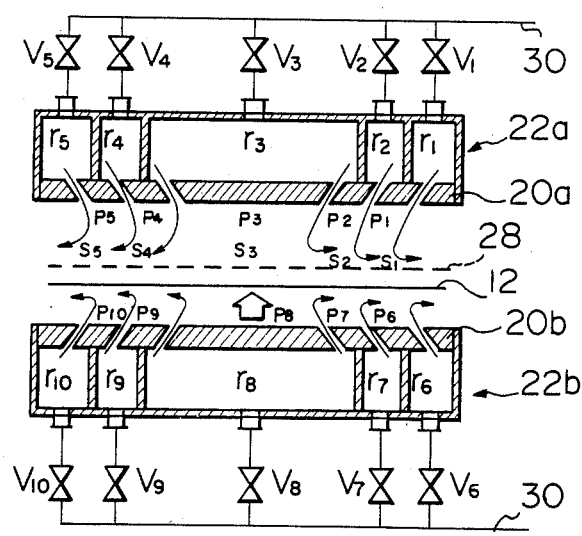
FIG. 9 is an explanatory lateral cross-sectional view of an embodiment of the apparatus of the present invention in which a metal strip has run outside its predetermined moving path.

Referring to FIG. 9, the metal strip 12 has run outside its predetermined moving path 28. That is, the metal strip 12 is nearer to the front surface of the lower gas pressure pad 22b than to the front surface of the upper gas pressure pad 22a.

In the case where the flow speeds and pressures of the gas streams ejected through all the slits of the opening are substantially the same, the static gas pressures $P_1$ through $P_5$ in the static gas pressure regions generated in the upper gap between the upper gas pressure pad 22a and the metal strip 12 are, respectively, smaller than the static gas pressures $P_6$ through $P_{10}$ in the static gas pressure regions generated in the lower gap between the lower gas pressure pad 22b and the metal strip 12. That is $P_6 > P_1$, $P_7 > P_2$, $P_8 > P_3$, $P_9 > P_4$, and $P_{10} > P_5$. The reason for this is that the static pressure generated between the gas pressure pad and the metal strip is inversely proportional to the distance therebetween. The difference in pressure between the upper gap and the lower gap creates a restoring force in the direction indicated by the thick arrow in FIG. 9. This restoring force pushes the metal strip 12 up to the predetermined moving path 28 of the metal strip, in which path 28 the upper force applied to the upper surface of the metal strip 12 balances the lower force applied to the lower surface of the metal strip 12 so as to effectively prevent vibration of the metal strip 12.

Even if the gas pressure pads indicated in FIG. 9 are modified so that in each pad all the longitudinal and lateral slits are connected to a common single gas pressure chamber, the gas streams ejected through the slits create pushing forces on the metal strip in the manner mentioned above, and vibration of the metal strip is prevented.

The apparatus of the present invention can be applied to metal strips having various widths.

Figure 10:
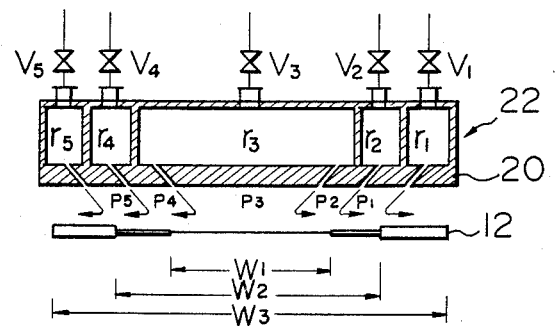
FIG. 10 is an explanatory lateral cross-sectional view of an upper gas pressure pad of the apparatus indicated in FIG. 9, indicating the relationship between the width of the metal strip to be held and the working width of the pad.

Referring to FIG. 10, when the metal strip 12 has a width $W_1$, the valves $V_1$, $V_2$, $V_4$, and $V_5$ are closed and only the valve $V_3$ is opened to supply a gas into the chamber $r_3$ and to eject the gas through the slits connected to the chamber $r_3$. That is, only a static gas pressure region having a static pressure $P_3$ is created. When the metal strip 12 has a width $W_2$, the valves $V_1$ and $V_5$ are closed, and the valves $V_2$, $V_3$, and $V_4$ are opened so as to create static gas pressure regions having static pressures $P_2$, $P_3$, and $P_4$. In this case, the valve V may be optionally closed so as to form a single static gas pressure region on the upper surface of the metal strip 12.

When the metal strip 12 has a width $W_3$, all the valves are opened so as to create five static gas pressure regions having static pressures $P_1$ through $P_5$. In this case, some of the valves may be optionally closed.

As described above, the apparatus of the present invention can separately control the flow velocities and pressures of the gas streams ejected through the longitudinal slits and, therefore, is applicable to metal strips of various widths. That is, the working width of the apparatus of the present invention can be rapidly changed in accordance with the width of the metal strip to be supported by the apparatus. Also, even when the width of the metal strip is small, it is possible to operate the apparatus of the present invention without ejecting unnecessary gas streams. Therefore, the operation of the apparatus of the present invention is highly economical. Furthermore, the apparatus of the present invention can prevent the flowing of gas streams over the side edges of the metal strip, which streams interact to create a turbulence and make the moving of the metal strip unstable.

The apparatus and method of the present invention are effective for restoring a twisted metal strip to its original position and for reforming a C-warped metal strip to its original shape.

Figure 11A:
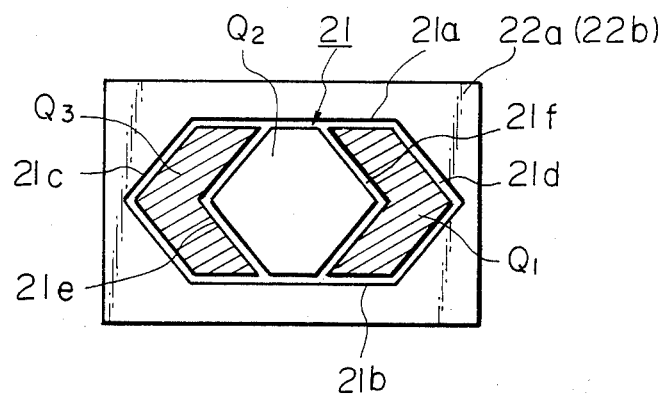
FIG. 11A shows a front view of an embodiment of a gas pressure pad of the present invention.
Figure 11B:
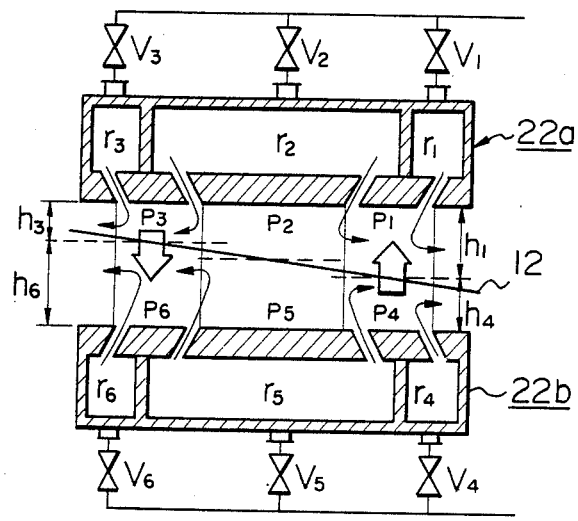
FIG. 11B shows a lateral cross-sectional view of a metal strip-supporting apparatus having the same type of gas pressure pad as that indicated in FIG. 11A, in which apparatus a metal strip is tilted from its original position.

Referring to FIGS. 11A and 11B, in each of a pair of gas pressure pads 22a and 22b the closed channel-shaped opening 21 is composed of a pair of lateral slits 21a and 21b and two pairs of longitudinal slits 21c and 21d and 21e and 21f. When a gas is ejected through the opening 21, three separate static gas pressure regions are created in the gap between each pad and the metal strip 12. That is, a right static gas pressure region having a static pressure $P_1$ corresponds to the area $Q_1$ indicated in FIG. 11A. A left static gas pressure region having a static pressure $P_3$ corresponds to the area $Q_3$ indicated in FIG. 11A. A center static gas pressure region having a static pressure $P_2$ corresponds to the area $Q_2$ indicated in FIG. 11A. The right and left static gas pressure regions are separated from each other by the center gas pressure region. Therefore, the static pressures $P_1$ and $P_3$ are changeable independently from each other.

Referring to FIG. 11B, when the metal strip 12 is twisted as indicated in the drawing, it is easy to control separately the static pressures $P_1$, $P_3$, $P_4$, and $P_6$ so as to restore the twisted metal strip to its original position. Also, when gas is ejected through all the slits under substantially the same pressure and the same flow velocity, since the static pressure in the static gas pressure region is inversely proportional to the distance between the gas pressure pad and the metal strip, a restoring force, indicated by the thick arrows in FIG. 11B, is naturally created so as to restore the tilted metal strip to its original position.

Figure 11C:
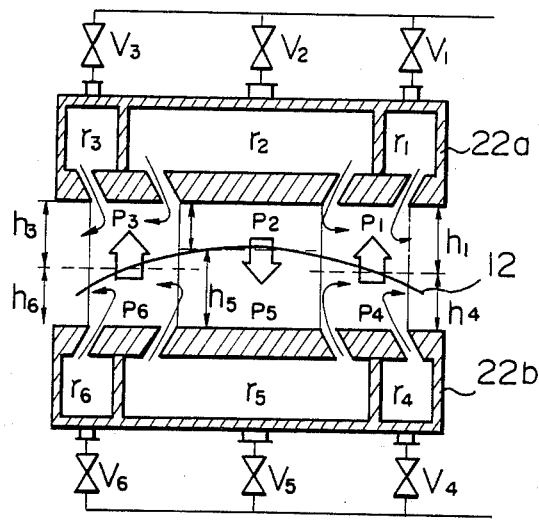
FIG. 11C shows a lateral cross-sectional view of the metal strip-supporting apparatus having a gas pressure pad indicated in FIG. 11A, in which apparatus a metal strip is C-warped.

Referring to FIG. 11C, the metal strip 12 is C-warped. Since the gas pressure pads 22a, and 22b can control the static pressures $P_1$ through $P_6$ independently from each other, it is easy to create a reforming force, indicated by the thick arrows in FIG. 11C, by controlling the static pressures $P_1$ through $P_6$. Even if gas is ejected through all the slits of the gas pressure pads 22a and 22b under substantially the same pressure and at substantially the same flow speed, the resultant static pressures created in the gaps between the gas pressure pads and the metal strip are inversely proportional to the distances between the gas pressure pads and the metal strip. That is, in FIG. 11C, the relationship $h_1 > h_4$ creates the relationship $P_1 < P_4$. That is, the difference between $P_1$ and $P_2$ creates a force which pushes up the right side edge portion of the metal strip 12, indicated by an arrow in FIG. 11C. Also, the relationship $h_2 < h_5$ creates the relationship $P_2 > P_5$. The difference between $P_2$ and $P_5$ creates a force which pushes down the center portion of the metal strip 12. Furthermore, the relationship $h_3 > h_6$ creates the relationship $P_3 < P_6$. The difference between $P_3$ and $P_6$ creates a force which pushes up the left side edge portion of the metal strip 12. Therefore, as a whole, the created forces can reform the C-warped metal strip to its original non-warped form.

Each of the gas pressure pads indicated in FIGS. 11A, 11B, and 11C has three or more separate gas pressure chambers. However, each gas pressure pad may have a single gas pressure chamber.

The relationship between the length of the longitudinal slit and the resultant static pressure is now described.

In FIGS. 12A, 12B, and 12C, the dimensions are as follows:

$t = 3$ mm, $h = 15$ mm, $\theta = 45$ degrees $b = 1500$ mm and $f_1 = 250$ mm.

The relationship between the length l of the longitudinal slits and the power of the blower motor necessary for creating a static pressure in a range of from 30 to 75 mmAq, which is high enough for practically carrying out the method of the present invention, is shown in Table 1.

TABLE 1

| | Power of blower motor (KW) Static pressure | | | |
|---|---|---|---|---|
| l | 30 mmAq | 45 mmAq | 60 mmAq | 75 mmAq |
| 0.2 m | — | — | 6.7 | 8.0 |
| 0.4 m | 4.2 | 5.6 | 7.6 | 9.3 |
| 0.6 m | 4.7 | 6.2 | 8.6 | 10.5 |
| 0.8 m | 5.2 | 6.9 | 9.5 | 11.6 |

Usually, it is preferable that the length l of the longitudinal slits be in a range of from 0.2 to 0.8 meters, that the static pressure be in a range of from 30 to 80 mmAq, and that the power of the blower motor be 8 KW or less.

Also, the relationship between the length of the longitudinal slits and the flow rate of the gas ejected through the slits when the flow velocity of the gas is in a range of from 29.6 to 46.9 meters/sec., when the ejecting pressure of the gas is in the range of from 0.418 to 0.585 mAq, and when the pressure loss in the pipeline is in the range of from 87.6 to 210 mmAq is indicated in Table 2.

TABLE 2

| | Flow rate of ejected gas Nm³/min | | | |
|---|---|---|---|---|
| Static pressure (mmAq) | 30 | 45 | 60 | 75 |
| Flow velocity (m/sec) | 29.6 | 36.3 | 41.9 | 46.9 |
| Ejecting pressure (mAq) | 0.418 | 0.452 | 0.536 | 0.585 |

TABLE 2-continued

| | Flow rate of ejected gas Nm³/min | | | |
|---|---|---|---|---|
| Pressure loss (mmAq) | 87.6 | 107.4 | 175.6 | 210.0 |
| Length of | 0.2 | — | — | 21.1 | 23.6 |
| Longitudinal | 0.4 | 17.0 | 20.9 | 24.1 | 27.0 |
| Slit (l) | 0.6 | 19.2 | 23.5 | 27.2 | 30.4 |
| (m) | 0.8 | 21.3 | 26.1 | 30.2 | 33.8 |

The thickness (t) of the longitudinal and lateral slits is preferably in a range of from 2 to 5 mm.

When the metal strip-supporting apparatus of the present invention is used in the hot galvanizing process for a metal strip, it is preferable that the gas pressure pads be located within 1000 mm from the wiping-gas nozzles.

Referring to FIG. 13, a metal strip 12 is hot galvanized with a molten metal 2 and is withdrawn upwardly from the molten metal 2. The surfaces of the metal strip 12 are wiped with gas streams ejected from a pair of wiping-gas nozzles. The gas streams blown onto the surfaces of the metal strip 12 form upward gas flows 51 and downward gas flows 52 along the surfaces of the metal strip 12. A pair of gas pressure pads 22a and 22b is located at a length L above the wiping-gas nozzles. When a gas is ejected through a pair of gas-ejecting openings 53a and 53b toward the surfaces of the metal strip 12, the resultant gas streams form the desired static pressure regions and flow outside the gaps between the front surface of the pads 22a and 22b and the surfaces of the metal strip 12. In this case, the downward gas flows 54 from the openings 53a and 53b come into contact with the upward gas flows 51 from the wiping-gas nozzles 6. The contacting downward gas flows 54 and upward gas flows 51 together form turbulences at the lower end portions of the gaps between the front surfaces of the pads and the metal strip surfaces.

Figure 14:
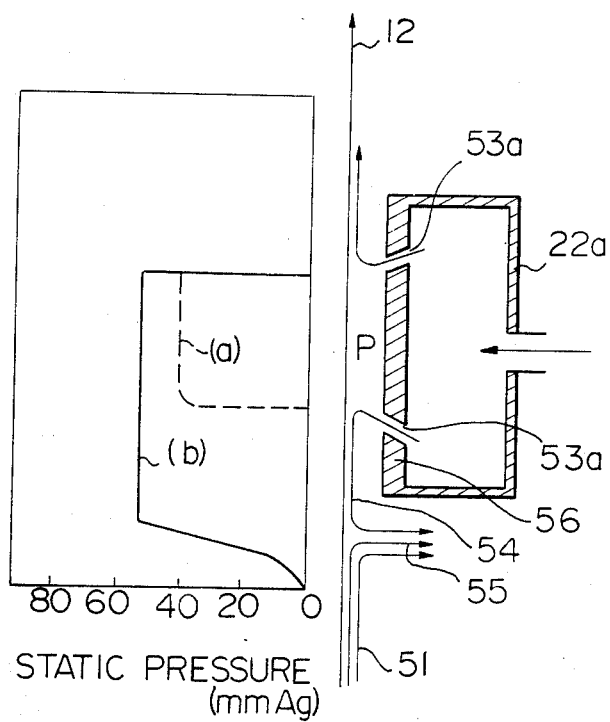
FIG. 14 shows an explanatory longitudinal cross-sectional view of a gas pressure pad located above a wiping gas nozzle (not shown) and a graph showing the distribution of static gas pressure created between the metal strip and the gas pressure pad.

Referring to FIG. 14, a turbulence 55 serves to seal the lower end portion of the gap between the pad surface and the metal strip surface and to confine a portion of the ejected gas in the gap. The distribution of pressure in the gap and the lower end portion of the gap is indicated in FIG. 14. In FIG. 14, line (a) indicates the level of the static pressure created in the gap only by the ejected gas streams and line (b) indicates the level of the static pressure which is the sum of the static pressures created by the confining gas streams and the static pressure created by the ejected gas streams.

As FIG. 14 clearly shows, the confining effect of the turbulence causes the static pressure in the gap to be increased and the entire area of the static gas pressure regions to be enlarged. Therefore, the above-mentioned arrangement of the gas pressure pads is effective for preventing vibration of the metal strip. Also, in order to enlarge the area of the static pressure region, it is effective to make the length of the end portion 56 of the gas pressure pad 22a long.

By utilizing the confining gas streams, it becomes possible to create a higher static gas pressure than that created only by the ejected gas streams, or to create the same static gas pressure as that created only by the ejected gas stream, by using a reduced amount of the ejected gas.

Figure 15:
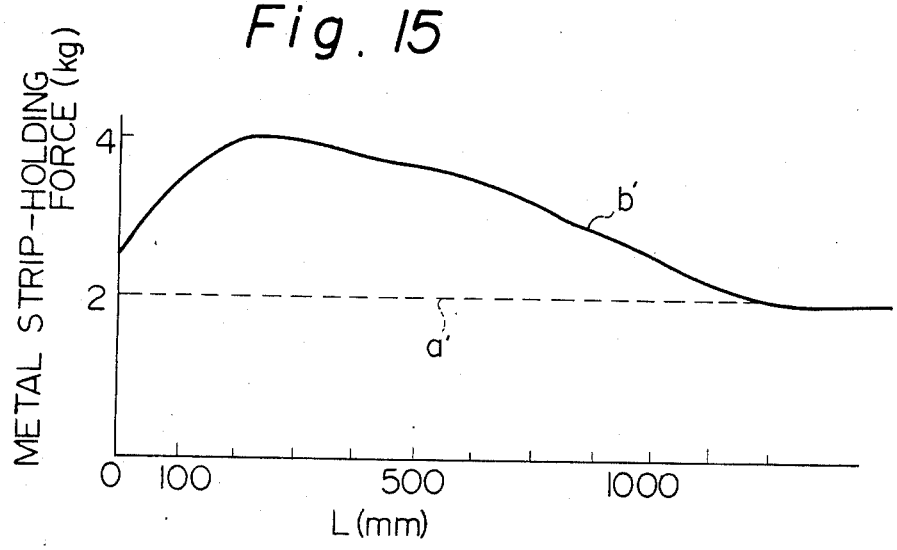
FIG. 15 is a graph showing the relationship between the metal strip-supporting force and the distance L between the gas pressure pad and the wiping gas nozzle.

FIG. 15 shows the relationship between the distance L from the gas pressure pads to the wiping-gas nozzles and the supporting force for the metal strip generated due to the static gas pressure in the gap. In FIG. 15, line a' indicates the level of the metal strip-supporting force created due to the static pressure of the ejected gas streams alone, and line b' indicates the level of the metal strip-supporting force created due to the combination of the ejected gas streams and the confining gas streams. FIG. 15 clearly shows that when L is 1000 mm or less, the line b' is above the line a', that is, the confining gas streams exhibit a static pressure to be added to the static gas pressure of the ejected gas streams. Also, FIG. 15 shows that it is preferable that L be in a range of from 20 to 850 mm, more preferably from 100 to 500 mm.

Figure 16:
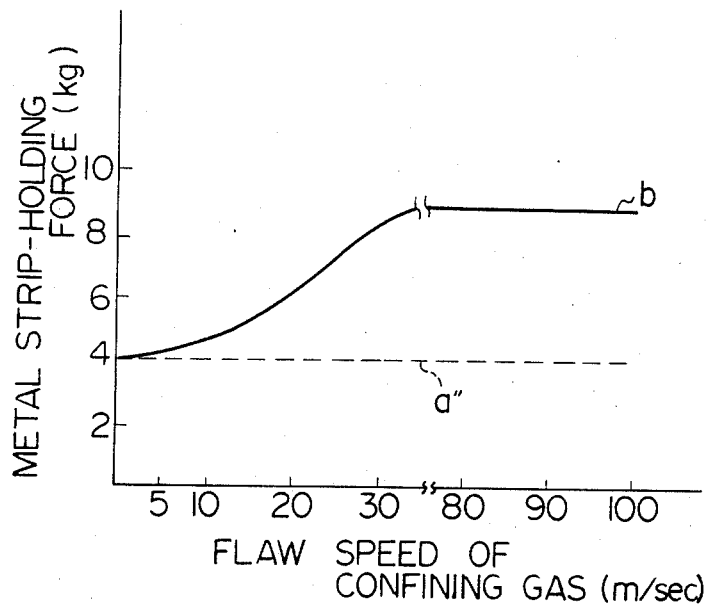
FIG. 16 is a graph showing the relationship between the metal strip-supporting force and the flow speed of a confining gas.

FIG. 16 shows the relationship between the metal strip-supporting force and the flow speed of the confining gas streams flowing along the surface of the metal strip toward the gap between the gas pressure pad and the metal strip. In FIG. 16, line a'' indicates the level of the metal strip-supporting force created only by the ejected gas streams from the gas pressure pad and line b'' indicates the level of the metal strip-supporting force created by the combination of the ejected gas streams and the confining gas streams.

FIG. 16 shows that the metal strip-supporting force increases with an increase in the flow velocity of the confining gas streams from 0 to about 35 meters/sec. and reaches a constant value at a flow velocity of about 35 meters/sec. Accordingly, it is clear that the flow velocity of the confining gas streams should be 10 meters/sec. or more.

The confining gas streams are derived not only from the gas-wiping operation in the hot galvanizing process but also from the heating gas streams flowing along the surface of the metal strip created in a vertical-type continuous annealing furnace due to the drafting effect of the heating gas. The heating gas streams can serve as confining gas streams.

The confining gas streams may be intentionally generated by blowing a gas along the surface of the metal strip to be supported toward the gas between the metal strip and the gas pressure pad.

In the metal strip-supporting apparatus of the present invention, vibration of the metal strip can be prevented by arranging a pair of gas pressure pads at a location in which the metal strip exhibits the largest amplitude of vibration. Also, in order to prevent vibration of the metal strip at a specific location, it is necessary to arrange a pair of gas pressure pads at a specific location or in the vicinity of a specific location.

FIG. 17A shows a hot galvanizing apparatus for a metal strip. A metal strip 12 is hot galvanized and then moved from the bottom roll 3 to the top roll 5. In this case, a source of vibration to be produced in the metal strip 12 is located at the location 61 and the metal strip 12 exhibits a maximum amplitude of vibration at a location 62. In order to prevent the vibration indicated in FIG. 17A, it is preferable that a pair of gas pressure pads 7 be arranged at the location 62 indicated in FIG. 17B. If it is necessary to prevent vibration of the metal strip 12 at a specific location 63, it is preferable that the pair of gas pressure pads 7 be located at the specific location 63 indicated in FIG. 17C or in the vicinity of the specific location 63, indicated in FIG. 17D.

In the case where in a hot galvanizing apparatus as indicated in FIG. 18 a furnace 60, for example, a cooling furnace, is disposed between the bottom roll 3 and the top roll 5, sometimes the metal strip 12 is vibrated and comes into contact with the wall surface of the furnace. In order to prevent vibration, it is preferable that a pair of gas pressure pads 7 of the present invention be disposed in the middle portion of the furnace 60, as indicated in FIG. 18.

As stated above, the metal strip-supporting apparatus of the present invention having specific gas-ejecting openings allows the metal strip to move at a high speed while preventing vibration of the metal strip. The working width of the metal strip-supporting apparatus of the present invention can easily be changed in accordance with a change in the width of the metal strip. Also, the metal strip-supporting apparatus of the present invention can restore the twisted metal strip to its original position. Furthermore, the metal strip-supporting apparatus of the present invention can reform the C-warped metal strip to its original non-warped shape.

The metal strip-supporting apparatus of the present invention may have a special pattern of gas-ejecting openings which are effective for preventing local overheating or overcooling of the metal strip during the supporting procedure to produce a metal strip product having satisfactory surface thereon.

The metal strip-supporting apparatus and method of the present invention make it possible to utilize the confining gas streams flowing toward the gap between the metal strip and the gas pressure pads along the metal strip surfaces. The confining gas streams are effective for increasing the metal strip-supporting force of the apparatus and for reducing the amount of gas ejected from the gas pressure pads.

EXAMPLE

A pair of gas pressure pads indicated in FIGS. 7, 8 and 19A through 19C were used. Each pad had a gas-ejecting opening having the following dimensions:

$a = 500$ mm, $b = 700$ mm, $c = 1100$ mm, $d = 1500$ mm, $t = 2$ mm, $\theta = 45$ degrees, $f_1 = f_2 = f_3 = f_4 = 200$ mm.

The distance 2h between the front surfaces of the pads was 30 mm.

The pair of gas pressure pads was arranged in a hot galvanizing apparatus as indicated in FIG. 1. The location of the gas pressure pads was 500 mm above the wiping gas nozzles.

A metal strip having a width of 1250 mm and a thickness of 0.32 mm was moved, at a speed of 120 meters/min. under a tension of 1.2 kg/mm², between the bottom roll and the top roll.

When no gas pressure pad was used, the metal strip vibrated at a frequency of 3 to 4 Hz at an amplitude of 4 to 5 mm and C-warped at a depth of 10 mm.

Pressurized air was fed into the gas pressure pad from a blower at a flow rate of 30 Nm³/min. under a blowing pressure of 400 mmAq and was ejected onto the surfaces of the metal strip through the gas-ejecting openings at a flow rate of 15 m³/min. Referring to FIG. 7, the flow rates of air flowing into the chambers $r_1$ through $r_{10}$ were all the same. Referring to FIG. 8, the resultant static pressures were as follows:

$P_1 = P_5 = 30$ mmAq $P_2 = P_4 = 35$ mmAq $P_3 = 40$ mmAq.

During the supporting procedure, the metal strip exhibited a small C-warp having a depth of about 3 mm and vibrated at a frequency of 3 to 4 Hz at an amplitude of 1 mm or less.

In the above-mentioned example, the apparatus and method of the present invention were applied in the continuous hot galvanizing process. However, the apparatus and method of the present invention can be advantageously applied in a process for continuously producing a painted steel strip. In this process, the painted steel strip is supported by the static gas pressure while the paint applied onto the steel strip is not yet solidified. The apparatus and method of the present invention are effective for preventing local overcooling of the paint layer on the steel strip and for producing a painted steel strip having a uniform appearance.

Furthermore, the apparatus and method of the present invention can be applied to a process for continuously annealing a cold-rolled steel strip, in which process the steel strip is supported by a static gas pressure generated on both surfaces of the steel strip in a heating zone and a cooling zone in an annealing apparatus. In this annealing process, the apparatus and method of the present invention are effective not only for preventing the generation of vibration but also for reforming the deformed steel strip. Additionally, the apparatus and method of the present invention are effective for preventing local cooling or heating of the steel strip and for producing an annealed product having a uniform quality.

We claim:

1. In a method for supporting a metal strip moving in a predetermined path with static gas pressure generated on both sides of said metal strip, said method comprising:

ejecting a heating or cooling gas from a pair of gas pressure pads facing each other and located symmetrically about said predetermined moving path of said metal strip, wherein said ejecting takes place onto both surfaces of said metal strip moving along said predetermined moving path between said pair of gas pressure pads, wherein each gas pressure pad is provided with a gas ejecting opening with said heating or cooling gas being ejected therethrough, each said opening being formed in a front surface of each gas pressure pad facing said moving strip, each said opening being composed of a pair of transverse slits with each transverse slit extending in a direction at right angles to the longitudinal axis of said predetermined moving path of said metal strip and at least two pairs of supplementary slits each connecting therethrough said transverse slits to each other thereby providing a closed channel-shaped opening, each said opening being symmetrical about the longitudinal center line of the front surface of the respective gas pressure pad, each said center line being parallel to said longitudinal axis of said predetermined moving path whereby said ejecting of gas forms a closed curtain-shaped stream of said ejected heating or cooling gas defining at least three closed regions between each surface of said moving metal strip and each gas pressure pad front surface facing the metal strip surface, thereby creating static gas pressure in said closed regions with said static gas pressure in said closed regions being symmetrical about the longitudinal axis of said predetermined path of said moving strip, the improvement comprising:

each of said supplementary slits has its longitudinal axis lying in the plane parallel to the longitudinal axis of said predetermined moving path of said metal strip and inclined with respect to the longitudinal axis of said predetermined moving path of said metal strip, and ejecting curtain segments of said heating or cooling gas from said supplementary slits thereby contacting both surfaces of said moving metal strip at said incline of said supplementary slits and substantially reducing localized over-heating or over-cooling of said metal strip.

2. The method as claimed in claim 1, wherein said static gas pressure regions all exhibit the same static gas pressure.

3. The method as claimed in claim 1, wherein the pressures of a pair of gas streams ejected through each pair of supplementary slits of said opening are the same.

4. The method as claimed in claim 3, wherein the pressures of pairs of gas streams ejected through pairs of supplementary slits of said opening are the same.

5. The method as claimed in claim 3, wherein the pressure of each pair of gas streams ejected through each pair of supplementary slits of said opening is different from that of the other pairs of gas streams ejected through the other pairs of supplementary slits of said opening.

6. The method as claimed in claim 1, wherein said static gas pressure regions have a static gas pressure of from 30 to 80 mmAq.

7. The method as claimed in claim 1, wherein a confining gas stream is blown toward the gap between the gas pressure pad and the metal strip along the metal strip surface.

8. The method as claimed in claim 7, wherein the source of the confining gas stream is a wiping gas nozzle located 1000 mm or less from the closest end of the gas pressure pad.

9. The method as claimed in claim 7, wherein said confining gas stream has a flow velocity of 10 meter/sec. or more.

* * * * *